July 30, 1963  B. E. PLATT  3,099,038
POULTRY GIZZARD SKINNER
Filed Oct. 26, 1961  3 Sheets-Sheet 1
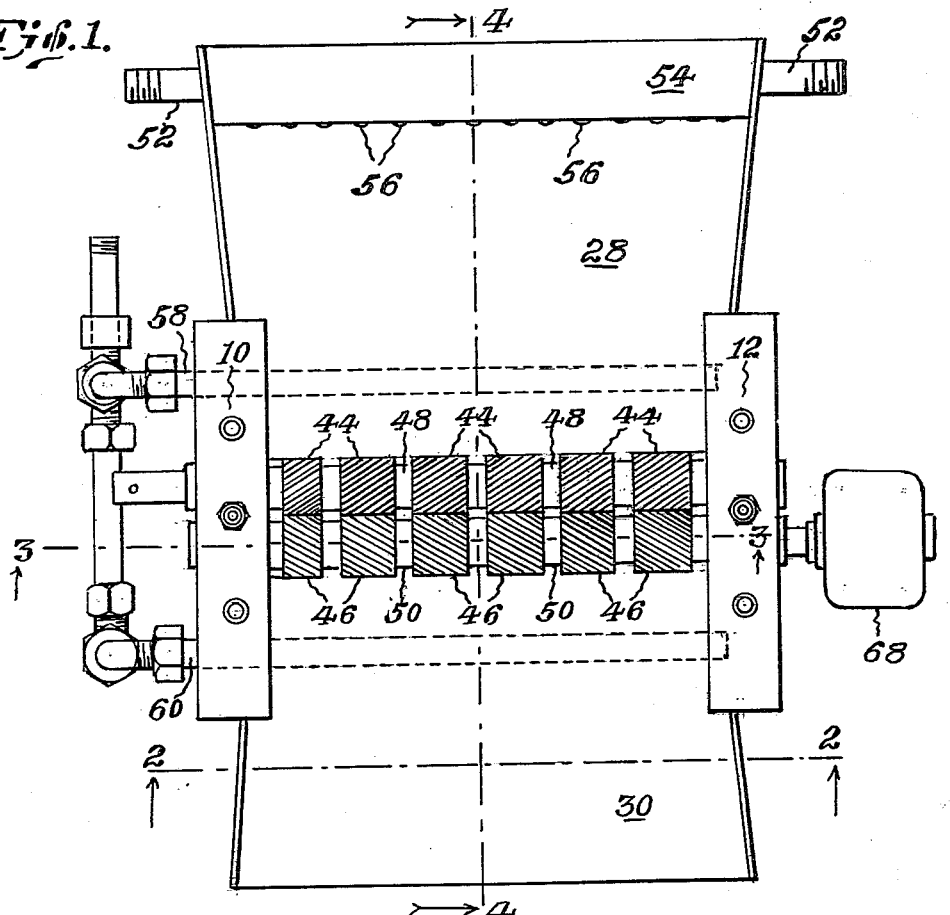
Fig. 1.
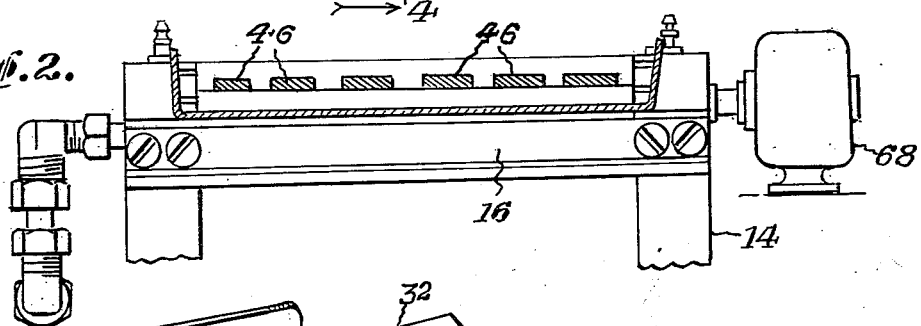
Fig. 2.
Fig. 7.
INVENTOR.
BEN E. PLATT.
BY Mason, Mason & Albright
ATTORNEYS.

July 30, 1963  B. E. PLATT  3,099,038
POULTRY GIZZARD SKINNER
Filed Oct. 26, 1961  3 Sheets-Sheet 2

INVENTOR.
BEN E. PLATT.
BY
Mason, Mason & Albright
ATTORNEYS

July 30, 1963 B. E. PLATT 3,099,038
POULTRY GIZZARD SKINNER
Filed Oct. 26, 1961 3 Sheets-Sheet 3
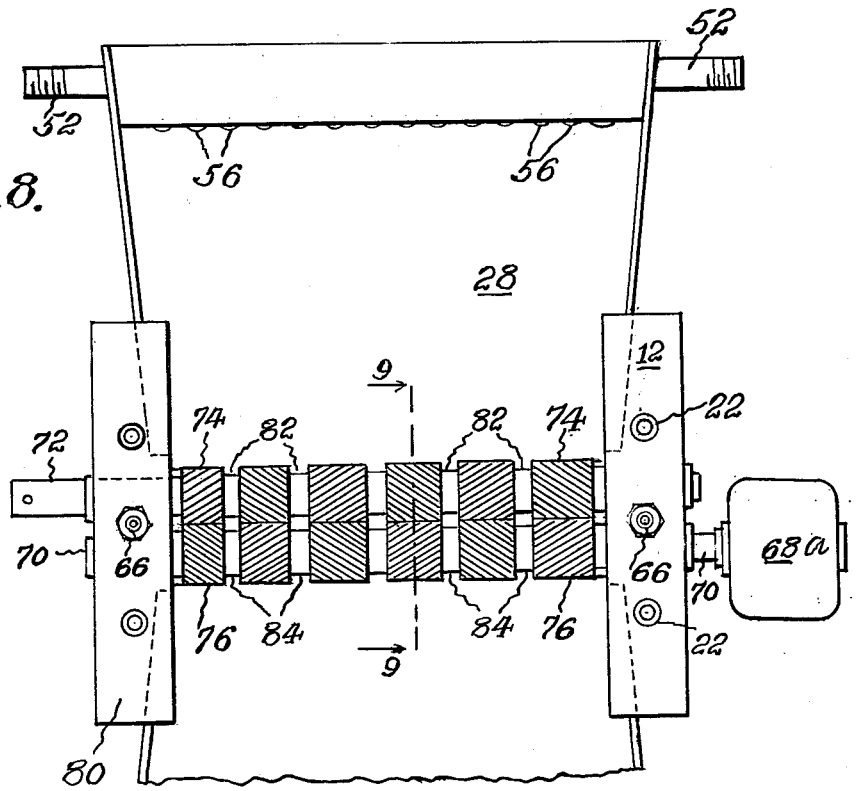
Fig. 8.
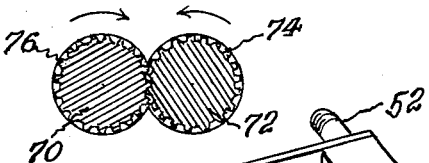
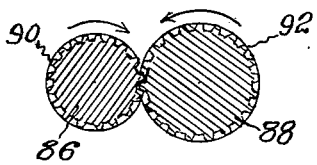
Fig. 9.
Fig. 10.
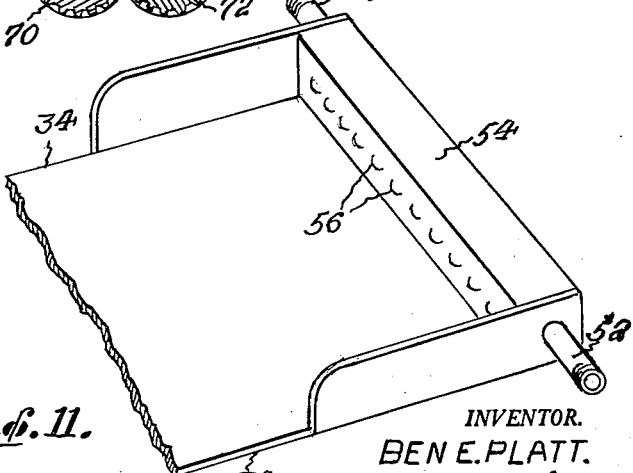
Fig. 11.
INVENTOR.
BEN E. PLATT.
BY Mason, Mason & Albright
ATTORNEYS.

United States Patent Office 3,099,038
Patented July 30, 1963

3,099,038
POULTRY GIZZARD SKINNER
Ben E. Platt, P.O. Box 494, Gainesville, Ga.
Filed Oct. 26, 1961, Ser. No. 147,959
8 Claims. (Cl. 17—11)

This invention relates to a machine for removing the linings from the gizzards of birds, such as chickens, turkeys, or other fowls. The invention herein described and claimed is an improvement of the device shown in my Patent No. 2,861,293, granted November 25, 1959.

It is an object of the invention to improve the means for removing the linings from the gizzards of fowls with a minimum loss of meat.

A further object is to provide a device of the type described that decreases the time necessary for removing the gizzards of various types of fowls.

Another object is to provide a device in accordance with the foregoing having novel cleansing means for cleaning the gizzards as the skin is removed.

A further object of the invention is to provide a machine of this character with means for automatically cleaning the rolls having the cutting teeth thereon as the operation proceeds whereby to handle a maximum number of poultry gizzards within a minimum amount of time.

Still another object of the invention is the provision of means including adjustable pans whereby the pans may be positioned at different heights to enable the machine to be reversed. In other words, this object is accomplished by providing means for adjusting the inclination of the pans which are located on the opposite sides of the rolls of the machine whereby, when the rotation of the rolls located between said pans is reversed, the gizzards may be fed from the opposite pan from the pan originally used as the pan for feeding the gizzards to the rolls.

Additionally, an object of the invention is to provide a novel roll mechanism by which the rolls are virtually self-cleansing and by which clogging of the rolls is obviated during the processing of a large number of gizzards through the machine.

A supplemental object is to provide rolls having meshing teeth with discontinuous portions whereby to more readily separate the linings from the gizzards of fowls of various types, and to elect extraneous materials, thus preventing injury to the roll teeth.

Other objects of the invention will appear hereinafter throughout the specification.

In the drawings:

FIGURE 1 is a top plan view of one form of the machine;

FIGURE 2 is a sectional view taken on the line 2—2 of FIGURE 1;

FIGURE 7 is a perspective view of one of the pans;

FIGURE 8 is a top plan view of a second form of the invention;

FIGURE 9 is an enlarged sectional view taken on the line 9—9 of FIGURE 8;

FIGURE 10 is a vertical sectional view of a third form of the rollers; and

FIGURE 11 is a perspective view partly broken away of the other of the two pans.

Figure 3:
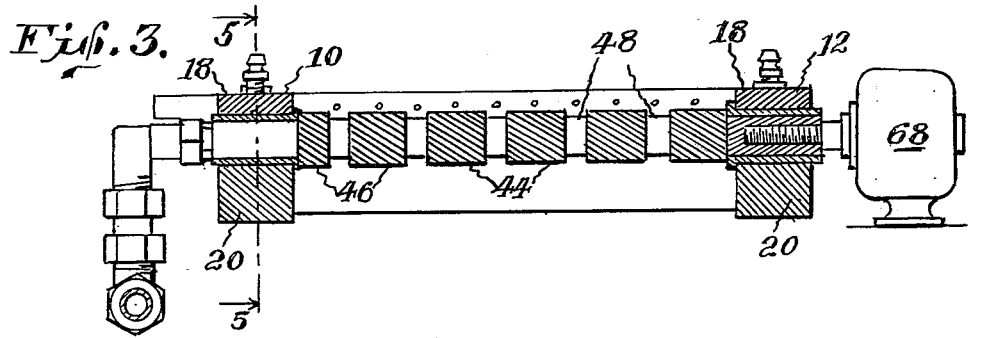
FIGURE 3 is a sectional view taken on the line 3—3 of FIGURE 1.
Figure 4:
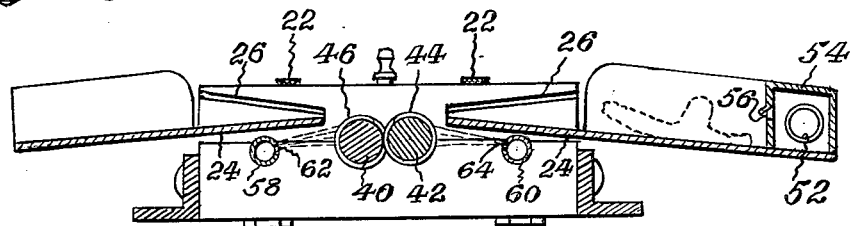
FIGURE 4 is a sectional view taken on the line 4—4 of FIGURE 1.
Figure 5:
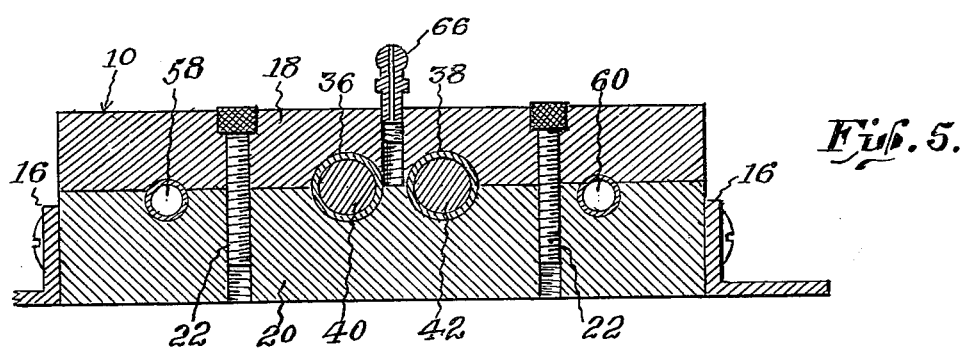
FIGURE 5 is an enlarged sectional view taken on the line 5—5 of FIGURE 3.

Referring now in detail to the drawings and particularly to the structure shown in the FIGURES 1 to 7, inclusive, the numerals 10 and 12 show the spaced blocks which are mounted on a framework 14. These blocks are connected to each other and to the framework by cross-support 16. As shown in FIGURE 5, each block composes a pair of block sections, 18 and 20, that are held to each other by machine screws 22.

The inner facing surfaces of each upper block section 18 are provided with inclined grooves 24 and 26 for the reception of the side edges of the pans 28 and 30. The grooves 24 and 26 are in the opposite faces of the upper block sections. Each pan is provided with side edges 32 and 34 whereby, when one pan is inserted in the facing grooves 26 on one side of the center line of the block section, the other pan will be inserted in the facing groove 24 on the opposite side of the center line of both block sections; see FIGURE 6. In other words, one pan will be located in the grooves 26 of both block sections while the other pan will be located in grooves 24 of both block sections. Then, when it is desired to reverse the feeding operation so that one pan will be higher than the other and thus become the feeding end, the pan which is in the groove 26 is removed and inserted in the groove 24, and on the opposite side of the line X—X, the other pan is removed from groove 24 and inserted in groove 26. Each of the blocks is provided with spaced bearings 36 and 38 in a manner similar to that shown in my patent, supra, for the support of the rotary shafts 40 and 42.

Each shaft is provided with teeth sections 44 and 46 which mesh with each other. These sections are of varying widths, or they may all be the same width, for the purpose of illustration they have been shown as being of varying widths in FIGURES 1 and 3.

Figure 6:
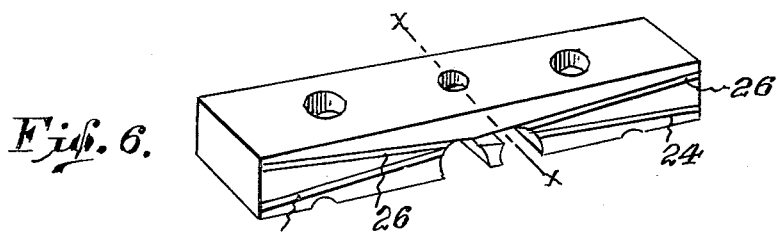
FIGURE 6 is a perspective of one of the block sections used to support the pans and rollers.

Preferably, the ends of the shafts 40 and 42 are provided with inner meshed gears such as illustrated in FIGURE 6 of my patent referred to above in order that one shaft positively drives the other shaft.

It will be noted by reference to FIGURES 1 and 3 that the inner meshed teeth sections 44 and 46 are separated from each other by spaces 48 and 50, respectively, of lesser diameter than the diameters of the teeth sections.

Pan 28 is provided with water connections 52 and with a manifold 54 having a series of outlet openings 56 whereby the pan 28 may be continuously flushed with water or other cleansing fluid.

Additionally, each block is provided with pipes 58 and 60, said pipes extending along beneath the rolls, and to one side thereof, beneath the pans. Each pipe is provided with outlet openings 62 and 64 by which water is supplied as shown in FIGURE 4. Water under pressure may be supplied to the pipes 52 and to the pipes 58 and 60 from any suitable source, and the amount of pressure may be varied in accordance with the adjustment of valves, not shown.

The numeral 66 shows a lubricating connection for lubricating the bearings 36 and 38 within the blocks.

One of the most important features of the invention described above is the spaced intermeshing teeth sections. The spaces between the teeth sections provide for ready disposal of the gizzard skins and prevent clogging of the intermeshed tooth sections.

It will be observed that the drawings show a drive means 68 for the shaft 40. This may be a pulley and belt drive, or an electric motor, as shown, may be directly connected to the shaft. In the form shown in FIGURES 8 and 9, the machine is substantially the same as that shown in FIGURES 1 to 7 except that, in FIGURES 8 and 9, each of the shafts 70 and 72 have teeth sections 74 and 76; alternate ones of said teeth sections of each shaft being oppositely inclined.

FIGURE 10 illustrates still another form of the invention wherein the drive shaft is indicated by reference numeral 86 and the other roller shaft is indicated by reference numeral 88. It will be noted by reference to FIGURE 8 that the tooth sections are spaced from each other by spaces 82 and 84 which are of smaller diameter than those of the teeth sections. In the FIGURE 10 construction, which is a third form of the invention, one of the rollers is larger than the other roller so that one roller will run at a different speed from the other one. The rollers are indicated by reference numerals 86 and 88 and the teeth by numerals 90 and 92, respectively.

Referring to the pitch of the teeth in all of the forms shown, it has been found that a 24 pitch and a 20 pitch tooth with an angle of about 30° to 30°10′ from a vertical line which intersects the teeth ensures an efficient operation of the machine. Actually, a true gear form is not used, and several different pitches and angles may produce essentially the same results. Consequently, I do not wish to be limited to the particular pitch of the teeth of either roller.

In the structure shown in FIGURE 10, I prefer to use a ¾′ center and a 24′ pitch. This provides 15 teeth per roll or a total of 30 teeth. By using a 16 tooth driven roll and a 14 tooth driven roll, it is possible to run the driven roll somewhat faster than the r.p.m. of the motor or driving shaft. This structure appears to give better results as far as cleaning is concerned and provides a faster construction whereby more gizzards can be skinned than otherwise would be possible. On the other hand, this structure is inclined to roll the gizzards over and sometimes peel the fat off the gizzard, at least in some areas.

Some of the advantages of the construction which utilizes rollers having intermeshed teeth sections with spaces between the meshed sections are as follows:

(1) More gizzards can be skinned or peeled in a given time.

(2) Less contaminated material is mixed with the skinned gizzards.

(3) Gizzards do not run to the end of the rolls as with those that have continuous spiral teeth.

(4) Gizzards are not rolled over, causing fat to be peeled off.

(5) More usable cutting and peeling area is provided.

(6) Longer roller life with more points to start the peeling operation than when using continuous spirals.

(7) Permits variation by reversing action of rolls whereby to add new cutting areas.

(8) Roll sections separated from each other eject "tramp materials," i.e. metals and other objects in gizzards. The spaces between teeth sections eject such materials without destroying the rolls, or injuring the teeth.

(9) Pans may be located at different heights to permit feeding of gizzards from the opposite side than originally used.

The above description and drawings disclose several embodiments of the invention and specific language has been employed in describing the several figures. It will, nevertheless, be understood that no limitations of the scope of the invention are thereby contemplated and that various alterations and modifications may be made such as would occur to one skilled in the art to which the invention relates.

I claim:

1. In a device of the character described, a supporting framework, blocks anchored to opposite sides thereof, a plurality of spaced shafts rotatably mounted in said blocks, each shaft having thereon a plurality of spaced toothed sections, each of the said toothed sections on one of said shafts intermeshing with a single corresponding toothed section on the other of said shafts, to form a pair of intermeshed toothed sections and each pair of said intermeshed teeth sections being spaced from the next adjacent pair of intermeshed toothed sections.

2. The structure of claim 1 wherein said toothed sections are at an inclined angle to the axial centers of said rollers.

3. The structure of claim 1 wherein the toothed sections of one roller are larger than the diameters of the toothed sections of the other roller whereby the r.p.m. of said first named roller is less than the r.p.m. of said other roller during the rotation of said rollers with the teeth in intermeshed position.

4. The structure of claim 1 wherein the teeth of the several toothed sections are between 30 to 33°10′ angle to the center line to which they are mounted.

5. The structure of claim 1 wherein the distance between said pairs of toothed sections on opposite shafts is about .25′.

6. The structure of claim 3 wherein the larger rollers contain at least two more teeth than the smaller rollers of each section.

7. The structure of claim 1 wherein said blocks are provided with inclined grooves on the opposite sides of said rollers, and removable pans adapted to engage a pair of grooves on one side of said rollers.

8. The structure of claim 1 wherein said blocks are provided with inclined grooves, a pan adapted to engage said grooves, said pan being provided with a fluid connection having fluid outlet means facing said pan whereby said pan may be flushed with fluid during the operation of removing the linings from said gizzards.

References Cited in the file of this patent

UNITED STATES PATENTS

| | | |
|---|---|---|
| 2,861,293 | Platt | Nov. 25, 1958 |
| 2,908,935 | Shrader | Oct. 20, 1959 |
| 2,962,986 | Olgiati | Dec. 6, 1960 |